US012721337B2

(12) United States Patent
Mora Franques

(10) Patent No.: US 12,721,337 B2
(45) Date of Patent: Sep. 1, 2026

(54) DEVICE FOR COOLING PLASMA

(71) Applicant: GRIFOLS WORLDWIDE OPERATIONS LIMITED, Dublin (IE)

(72) Inventor: Josep Oriol Mora Franques, Parets Del Valles (ES)

(73) Assignee: GRIFOLS WORLDWIDE OPERATIONS LIMITED, Dublin (IE)

( * ) Notice: Subject to any disclaimer, the term of this patent is extended or adjusted under 35 U.S.C. 154(b) by 113 days.

(21) Appl. No.: 18/284,371

(22) PCT Filed: Mar. 29, 2022

(86) PCT No.: PCT/IB2022/000158

§ 371 (c)(1),
(2) Date: Sep. 27, 2023

(87) PCT Pub. No.: WO2022/208166

PCT Pub. Date: Oct. 6, 2022

(65) Prior Publication Data

US 2024/0156082 A1 May 16, 2024

(30) Foreign Application Priority Data

Mar. 30, 2021 (EP) .................................... 21382264

(51) Int. Cl.
*F25D 11/02* (2006.01)
*A01N 1/144* (2025.01)
*A61J 1/16* (2023.01)

(52) U.S. Cl.
CPC .............. *A01N 1/144* (2025.01); *A61J 1/165* (2013.01); *F25D 11/02* (2013.01); *F25D 2331/803* (2013.01); *F25D 2400/28* (2013.01)

(58) Field of Classification Search
CPC .......... A01N 1/144; A61J 1/165; F25D 11/02; F25D 2331/803; F25D 2400/28
See application file for complete search history.

(56) References Cited

U.S. PATENT DOCUMENTS 5,182,869 A * 2/1993 Collet ................. F27D 15/0206 34/431
5,364,385 A * 11/1994 Harms .................. F25D 25/005 604/408

(Continued)

FOREIGN PATENT DOCUMENTS

AU 3314999 A 8/1999
CN 104670749 B 8/2017

(Continued)

OTHER PUBLICATIONS

International Search Report issued in International Application No. PCT/IB2022/0000158, dated Aug. 5, 2023.

*Primary Examiner* — Jonathan Bradford
(74) *Attorney, Agent, or Firm* — Knobbe, Martens, Olson & Bear, LLP

(57) ABSTRACT

A device is for cooling plasma for a center for collecting plasma by plasmapheresis. The device includes a casing with at least one cooling chamber in its interior. The chamber includes housings for cooling containers. The device also includes a refrigeration system arranged to refrigerate the chamber, and a control system for the refrigeration system. The refrigeration system and the control system are configured to control the temperature inside the device so as to allow the containers to be cooled to at least −30° C. in 60 minutes or less. The device includes at least two separate chambers contained in the casing, with each of the chambers including housings for bottles of plasma. The refrigeration system is arranged to refrigerate both chambers independently and the control system is configured to control the refrigeration of both chambers separately.

19 Claims, 4 Drawing Sheets

(56) References Cited

U.S. PATENT DOCUMENTS

| | | | | |
|---|---|---|---|---|
| 2010/0293970 | A1 * | 11/2010 | Mooijer | F25D 16/00 62/62 |
| 2016/0184827 | A1 * | 6/2016 | Ried | B01L 7/00 165/64 |
| 2016/0339420 | A1 * | 11/2016 | Machling | F25D 23/065 |

FOREIGN PATENT DOCUMENTS

| | | | | |
|---|---|---|---|---|
| CN | 108917263 | A | 11/2018 | |
| DE | 202013104657 | U1 | 10/2013 | |
| RU | 100909 | U1 | 1/2011 | |
| WO | WO 1997/030317 | A1 | 8/1997 | |
| WO | WO-2013012339 | A1 * | 1/2013 | F25D 31/007 |

* cited by examiner

DEVICE FOR COOLING PLASMA

BACKGROUND

Field of the Invention

The present invention relates to a device that allows blood-derived products, more specifically plasma, to be rapidly cooled.

Description of the Related Art

The term "plasma" refers to the acellular blood fraction and is obtained by rendering the blood free from cells such as red blood cells and white blood cells. Plasma is the main component of blood, representing approximately 55% of the total blood volume, while the remaining 45% corresponds to cellular components (such a magnitude is related to the haematocrit). Blood serum is what remains from blood plasma once the haemostatic factors are consumed by blood coagulation.

Plasma is also a necessary element for obtaining plasma protein medicines and plasma donations must be collected and then processed to obtain said medicines.

Fresh frozen plasma can be collected by apheresis, which is a general method or technique of extracorporeal blood purification whereby one constituent is removed and the remainder is returned to the patient. Plasmapheresis is a subset of apheresis whereby plasma is removed. Plasmapheresis is an extracorporeal blood filtering method or technique, which consists in removing blood from a donor, patient or individual in order to eliminate molecules with a high molecular weight and separate the white blood cells, red blood cells and platelets from the blood plasma. Separation of other blood components from the plasma is usually performed by centrifugation or through a filtration membrane. After separating the plasma, the rest of the blood (including the red and white blood cells) is returned to the body of the donor without said plasma, which the organism rapidly and effectively replaces.

Plasma donations are usually collected by plasmapheresis as the extraction process for removing plasma from the blood is highly effective and the organism rapidly replaces the plasma, allowing the recovery process following a donation to be quick and easy, so that a person is able to make very frequent plasma donations, up to twice over a seven-day period, with 48 hours between donations.

The plasmapheresis technique is also advantageous for eliminating particles with a high molecular weight, and reducing the level of circulating immune complexes or other components present in the plasma (which are components that intervene in the pathological immunological response and are considered responsible for the clinical manifestations of disease), and may therefore also be used for treating a wide variety of disorders, in particular those that affect the immune system such as systemic lupus erythematosus, Guillain-Barré syndrome, Goodpasture syndrome and thrombocytopenic purpura. This process may also be used to reduce the organ transplant rejection index, as this method eliminates the antibodies from the blood that cause the organ implanted in the recipient to be rejected and may even stimulate lymphocyte clones to enhance the cytotoxic therapy given to some individuals.

The donation process usually takes place in a donation centre which may be a mobile donation centre. Said donation takes an estimated period of approximately one hour, in which a volume of 800-900 ml is normally removed, although the volume may be less depending on the weight and health of the donor. Said plasma after being collected is kept in containers, preferably bottles, more specifically plastic bottles. The donated plasma must be suitably preserved by freezing for the subsequent processing thereof to obtain plasma protein medicines.

To maximise the amount of proteins from the plasma, it is recommended that the freezing process begins in the 30 minutes following the donation. Storing the plasma in a storage compartment at low temperatures for a high period of time could allow the plasma to eventually reach the desired temperature in the long term, but this process is slow and has the problem of the proteins being reduced over time, as well as not fulfilling the standards, regulations and/or recommendations on freezing plasma. Therefore, cooling must also be rapid with the plasma being cooled to a maximum temperature of −30° C. in under 60 minutes, said last parameters being those established by international standards on the shock freezing of blood plasma. Shock freezing, or rapid freezing or cooling is the rapid or quick freezing or cooling of a product, both terms being used as equivalents in this application, both being under the same standards. For example, the Guide to the preparation, use and quality assurance of blood components of the European Committee (Partial Agreement) on Blood Transfusion states that freezing must take place in a system that allows complete freezing within one hour to a temperature below −25° C. The Council of Europe on its guidelines for the preparation, quality control and use of fresh frozen plasma (FFP) also recommends that the complete freezing process should be as short as possible and that the time must be reduced to less than two hours and if possible to one hour. The United States Food and Drugs Administration (FDA) also states that immediately after filling, plasma intended for manufacturing into injectable products shall be stored at a temperature not warmer than −20° C. However, it is preferable for the cooling cycle to last 45 minutes.

This problem of rapid freezing or shock freezing is known. WO9730317A1 describes a freezer for blood plasma in receptacles, whose objective is enabling the freezing process itself to occur quickly enough for the plasma to reach a temperature of about −30° C. within an hour, stating that these parameters meet the basic requirement of rapid freezing. This document discloses freezing using forced convection, using air as a cooling medium. A problem with this freezer is that it is bulky in order to allocate all its elements such as a cooling battery for cooling a gas, a means for generating a flow of the cooled gas or a device for generating jets of the flow of the cooled gas. Another problem of this freezer is that due to using forced convection, it requires high energy consumption.

Opening the chamber while a cooling cycle is in progress may after the cooling cycle of the containers inside. Introducing new containers into the device during the period when a cooling cycle is taking place is therefore not recommended. Moreover, if a new container is introduced, this would be at a different point in the cycle from the rest of the containers inside the chamber, making it difficult to control the temperature of the containers. The containers are therefore introduced into a chamber of the device in groups or batches and subjected to the same cooling cycle inside the device so that all the containers reach the required temperature at the same time. Once the cooling cycle ends and the required temperature is reached, the plasma is transferred to a freezer at −40° C., which preserves said plasma until transfer to a main donation centre away from the donation centre where the donation takes place, which may be a mobile donation centre.

As it is advantageous for the containers to be introduced into the device during the 30 minutes following the extraction of the plasma, if the quantity of containers is smaller than the total capacity of the device, said containers must be introduced into the device without waiting for a quantity of containers equal to the total capacity of the device to be available. Therefore in devices with a single chamber it is recommended that all the donations should be carried out simultaneously in order to introduce the bottles of plasma into the device at the same time as, once the cycle has begun, the chamber should not be opened in order not to interrupt the process, which results in long idle times between donations.

SUMMARY

An objective of the present invention is to disclose a device for cooling bottles of plasma to at least −30° C. in a maximum of one hour, so that the donated plasma can be preserved, which device comprises at least two container cooling chambers, allowing the cooling of two different groups of bottles at the same time. One of the advantages of the configuration of the device according to the present invention, with two chambers, is that it allows two bottle-cooling cycles to be carried out simultaneously and phased over time. In other words, it allows cooling of bottles placed in housings in one of the chambers to begin while the cooling cycle in the other chamber is still in progress. Another advantage is that it makes it possible to work with quantities of bottles smaller than the total capacity of the device. This makes it easier to make donations even when there are few donors, something that is fairly common in small villages where donors appear randomly and at scattered intervals over time.

Moreover, another object of the present invention is to disclose a donation centre comprising said device. A further object of the present invention is to disclose a mobile donation centre comprising said device. In mobile centres, the availability of a bottle-cooling device nearby is problematic as cooling must begin less than 30 minutes after the donation has been made. Therefore having a bottle-cooling device in the actual donation centre is very advantageous.

More specifically, the present invention discloses a device for cooling plasma for a centre for collecting plasma by plasmapheresis. Said device comprises a casing with at least one cooling chamber in the interior thereof. Said chamber comprises housings for cooling containers, preferably by contact. In the context of this invention, the expression "cooling by contact" should be understood as cooling by contact or by natural convection, due to the proximity of the housing for cooling containers to said containers, without any forced convection or impelling of fluid. Thus, the cooling of the containers is made by contact of said containers with the housing or by natural convection. Cooling by conduction or by natural convection can be efficient, rapid, and without the need of equipment for impelling fluid which is bulky, economically expensive and very power-consuming.

The device also comprises a refrigeration system arranged to refrigerate said chamber, and a control system for the refrigeration system, the refrigeration system and the control system being configured to control the temperature inside the device so as to allow the containers to be cooled to at least −30° C. in 60 minutes or less. The device comprises at least two separate chambers contained inside said casing, each of the chambers comprising housings for bottles of plasma. Advantageously, the refrigeration system is arranged to refrigerate both chambers independently. The control system is configured to control the refrigeration of both chambers separately.

Being placed in two different chambers, the device allows two different groups of bottles to be refrigerated at the same time, each following its own cycle, without interrupting the cooling cycle of each group.

Preferably, the device comprises at least two independent lids on said casing, said lids being arranged so as to independently access each of the chambers. Preferably, the device comprises a base portion, the lids of the device and the base portion being connected together. More preferably, the casing of the device comprises a base portion. Still more preferably, the lids of the device and the base portion are connected together by hinges.

Preferably, the housings for the bottles of plasma comprise a refrigerating surface, more preferably refrigerated walls. Said refrigerating surfaces allow the bottles of plasma to be cooled by heat transfer.

Preferably, the housing for the bottles of plasma have a shape that matches the shape of the bottles. In this way, the distance of the bottles from the refrigerating surface is minimised, allowing closer proximity of the bottles for cooling by conduction by contact or, if that is not possible or attainable, by natural convection. Contact between the refrigerating surface of the housing and the bottles facilitate cooling of said bottles. The presence of air between bottle and housing makes cooling more difficult. If there is no contact between bottle and housing, the distance between their respective surfaces is preferably kept as small as feasible. Preferably, the housings have a shape that fits the shape of the bottles to allow said contact of said bottles with the refrigerated walls of the housings. The bottles of plasma may be of any known shape, being usually basically cylindrical or prism shaped. More preferably, the housings for the bottles of plasma are basically cylindrical or prism shaped. More preferably, the dimensions of the housings for the bottles of plasma are slightly larger than the dimensions of the bottles. In this way, the contact surface of the bottles with the housings is maximised when the dimensions of the bottles have increased owing to the dilation to which said bottles are subject during cooling caused by the volume of the contents, preferably plasma, expanding or increasing on being frozen. Preferably, the fit between bottle and housing may have some initial play, which disappears during cooling owing to the expansion of the bottle during freezing.

Alternatively, the device comprises housings which have shapes that are different from one another. In this case, each of the different types of housings is adapted to the shape of bottles with a different shape.

The device may comprise a flexible liner on the outer surface of the housings which has a liquid inside. Said liner allows air pockets between the housings and the bottles to be eliminated owing to better adaptation to the surface of the bottle. More preferably, the walls of said liner are made of a flexible and resilient material.

Preferably, the housings for the bottles of plasma are formed by an upper housing situated in a lid of the device and a lower housing situated in the base portion of the device.

Preferably, each chamber comprises at least three housings for bottles of plasma. More preferably, each chamber is divided into three housings for bottles.

Preferably, the refrigeration system and the control system for the refrigeration system are configured to control the temperature of the interior of the device so as to allow the containers to be cooled to −30° C. or less in 45 minutes or less. Preferably, said systems are configured to control the temperature inside the device so as to allow the containers to be cooled to −40° C. or less in 60 minutes or less. Still more preferably, said system is configured to control the temperature inside the device so as to allow the containers to be cooled to at least −40° C. in 45 minutes or less. The control system is also configured to change the programmed temperature.

Preferably, the control system is configured to carry out defrosting cycles in order to eliminate the ice that may form in the device, and a drain to remove the defrosting water.

Preferably, the control system comprises elements for controlling the refrigeration system situated close to the walls of the housings for the bottles of plasma. More preferably, the control system comprises a programmable logic controller (PLC) or a logic board.

Preferably, the device comprises display windows for observing the interior of each of the chambers. Said display windows allow the chambers to be observed from outside the device. In this way, it is possible to verify that the freezing is being carried out property. It is also preferable to have a display window for each of the chambers, as the bottles arranged in each of the chambers may have been introduced at different times, and some time may have passed since the introduction thereof.

Preferably, the device comprises a user interface to control both chambers. More preferably, the device comprises a single interface to control both chambers.

Preferably, the user interface is a touch screen. Preferably, the interface is positioned on a wall of the device. Said interface may monitor the cycles and control and program alerts, such as alerts indicating when a cycle has been completed, when the bottles have cooled to the required temperature, etc.

Preferably, the device comprises a bar code reader. Said reader allows the codes identifying each of the bottles to be read. Said reader is useful in the donation centres as the bottles normally have a bar code identifying the donation, and in addition the reader allows the bottles in a cycle to be easily identified.

Preferably, the device also comprises a sealing system, preferably a cable gland.

Preferably, the control system comprises an emergency stop button for the refrigeration system. More preferably, the emergency stop button is positioned on a front portion of the device. Still more preferably, the emergency stop button is set in an additional security module.

Preferably, the outer casing of the device is made of stainless steel.

Preferably, the device comprises insulation. More preferably, the casing of the device comprises internal insulation. Said insulation is preferably an insulation layer.

Preferably, the device is a built-in device.

The present invention also discloses a distribution centre, which comprises a device as described above. Preferably, the device is built into the interior of the distribution centre. More preferably, the distribution centre is a mobile distribution centre. Still more preferably, the mobile distribution centre comprises a vehicle in which the device is arranged. The mobile distribution centre is a plasma collection centre in which out-patient plasma extraction is carried out. It is then possible to distribute the plasma to hospitals or fixed distribution centres. Said mobile distribution centre may also be a mobile donation centre or plasma collection centre. More preferably, the mobile distribution centre comprises at least six seats for donation by patients, the device for the mobile distribution centre preferably comprising at least six housings for bottles of plasma, said housings being distributed in two independent chambers.

Preferably, the mobile distribution centre is a motor bus.

The present invention also discloses a fixed distribution centre which comprises a device according to the present invention.

BRIEF DESCRIPTION OF THE DRAWINGS

For a better understanding, the accompanying drawings show an embodiment of a device according to the present invention as an explanatory but non-limiting example.

DETAILED DESCRIPTION OF THE PREFERRED EMBODIMENT

Figure 1:
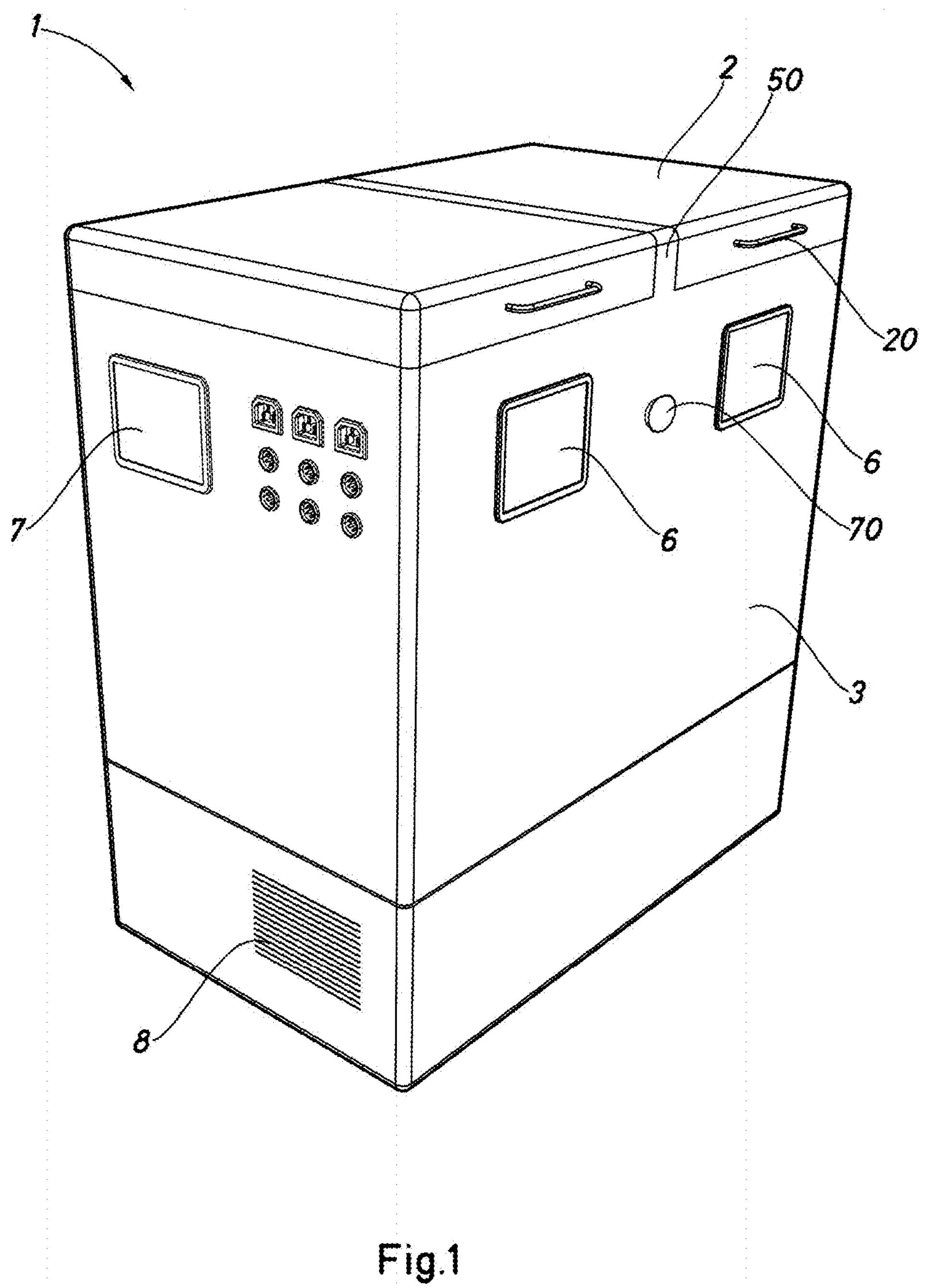
FIG. 1 is a perspective view of a plasma cooling device according to the present invention, with the lids of the chambers closed.

In the figures, elements that are the same or equivalent have been identified with identical reference numerals.

Figure 2:
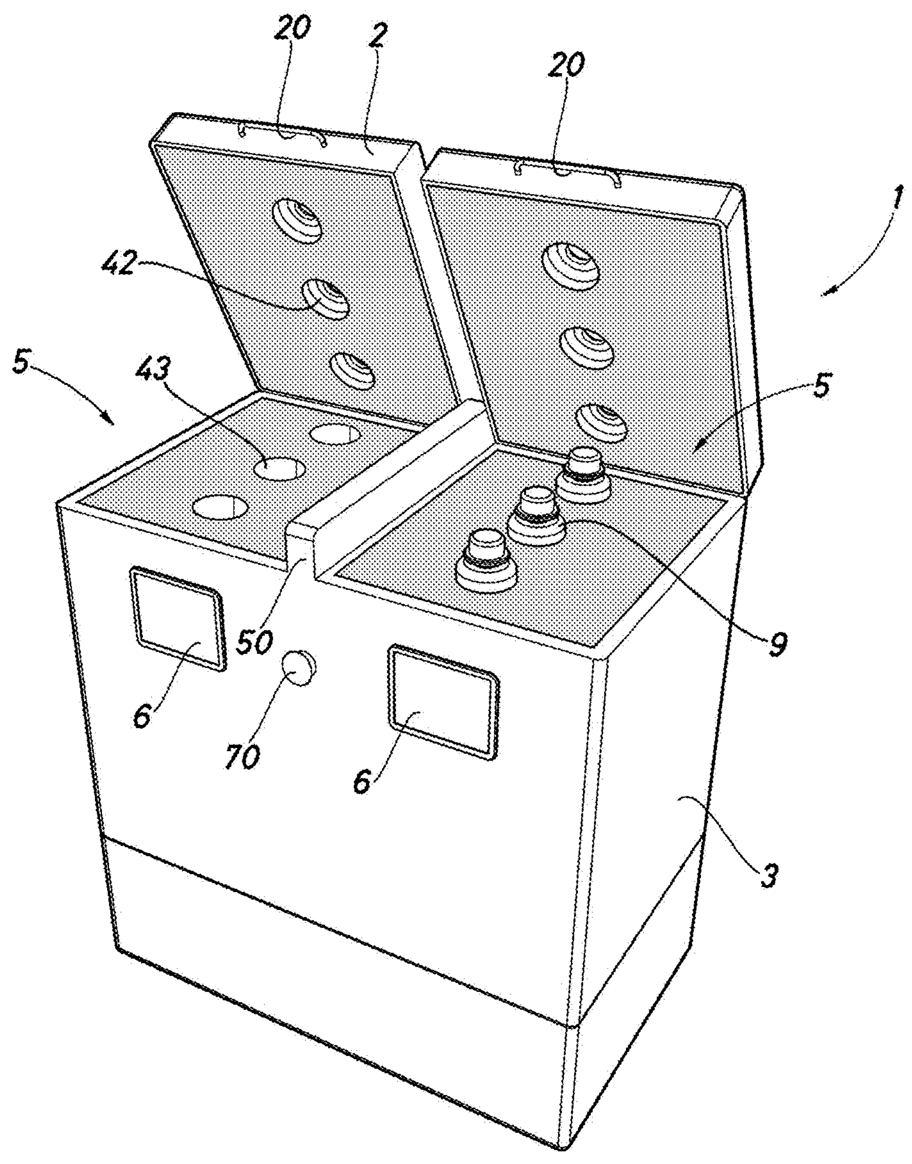
FIG. 2 is a perspective view of a plasma cooling device according to the present invention, with the lids of the chambers open.
Figure 3:
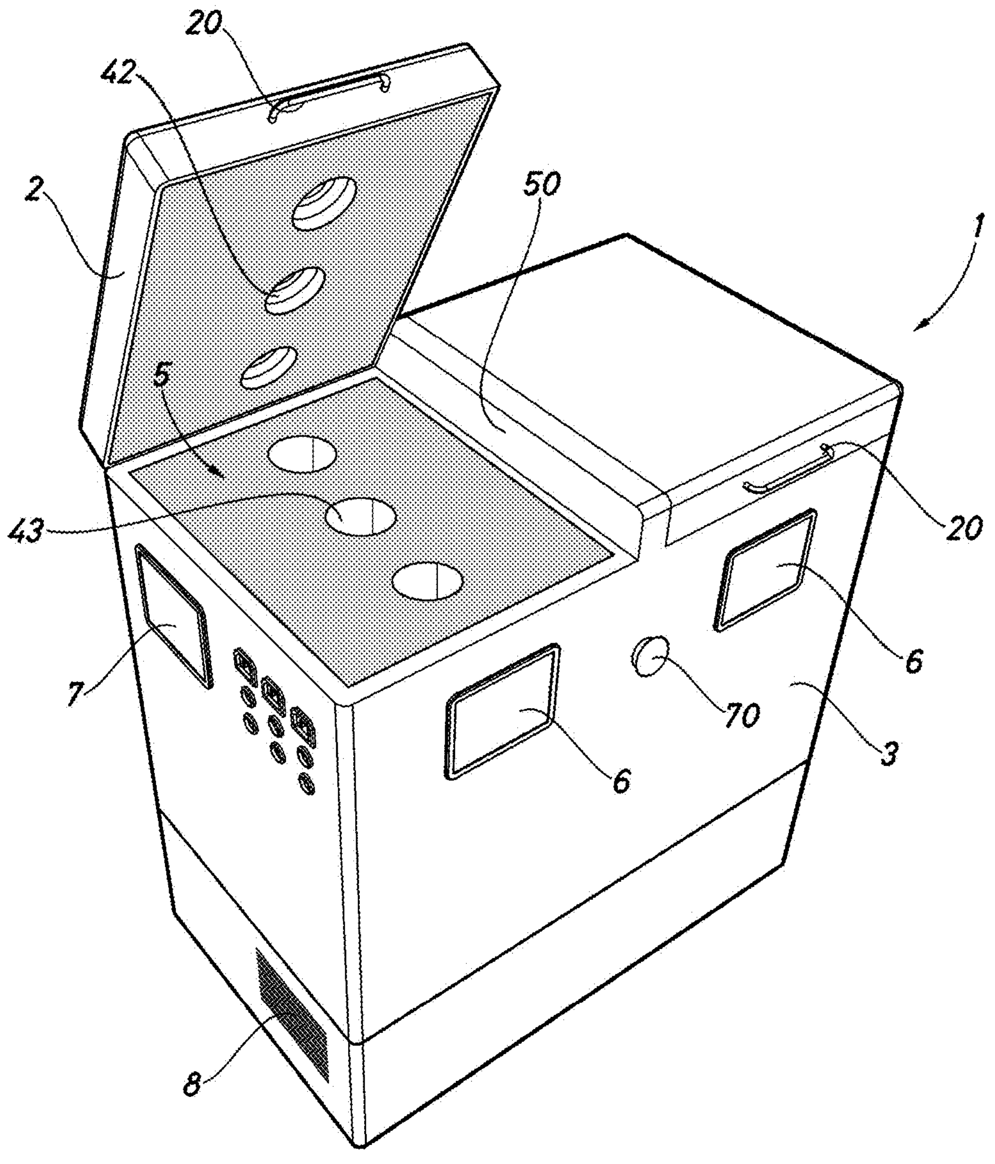
FIG. 3 is a perspective view of a plasma cooling device according to the present invention, with one of the lids of the chambers closed and the other lid of the chambers open.

FIGS. 1, 2 and 3 show an embodiment of a plasma cooling device 1 for a plasma collection centre using plasmapheresis.

FIGS. 1, 2 and 3 show a device 1 which comprises a casing and at least one cooling chamber in the interior thereof, shown in FIG. 2. The device also comprises a refrigeration system and a control system for the refrigeration system with the capability to cool the containers to at least −30° C. in 60 minutes or less.

The casing of the device 1 comprises a base portion 3 and two lids 2, the lids 2 of the device and the base portion being connected together by hinges. The device 1 comprises a casing made of stainless steel, and insulation in the interior thereof. The insulation of the device may be insulation of a known type which allows the exterior of the device to be insulated from the low temperatures in the interior thereof. The device 1 may have an electric connection of a known type and may be certified in accordance with the corresponding standards.

More specifically, the device 1 comprises two separate chambers 5 in the interior thereof (shown in FIGS. 2 and 3). Moreover, the device 1 comprises two lids 2, one for each chamber 5, through which the chambers 5 may be accessed in order to place containers 9 of plasma inside, more specifically bottles of plasma. Each lid 2 comprises an opening means 20 for opening each chamber 5, the opening means shown being a handle. Alternatively, the opening means for the lids may be of any known type, such as a knob, grip, holder, etc. A separating element 50 allows the two chambers 5 to be physically separated, allowing each chamber 5 to be opened independently.

Other means of accessing the chambers 5 may also be used, such as automatic doors or hatches. Said doors or hatches may be opened by a safety lock (the preferred opening method for horizontally oriented doors), by automatic opening from an interlocked bimanual door (the preferred opening method if the doors are oriented vertically) or by any other known opening method.

FIGS. 2 and 3 show the device with both lids 2 of the chambers 5 open (FIG. 2) and with one of the lids 2 open and the other closed (FIG. 3). In the example shown, the chambers are shown arranged vertically, although alternatively the different chambers may be positioned horizontally, such that opening is by a front portion of the device 1. In an alternative embodiment, the chambers 5 may be positioned asymmetrically, having different sizes and configurations, as this patent is not limited to a specific model of chamber.

The chambers 5 comprise individual housings for cooling containers, more specifically for cooling bottles 9 of plasma. In the device 1 shown in the figures, the walls of the housings are refrigerated by the refrigeration system.

The housings of the device 1 have a shape that matches the shape of the bottles to allow contact of the bottles with the refrigerating walls of the housings. Because of the dilation to which the bottles are subjected during cooling, the dimensions of the housings for the bottles of plasma may be slightly larger than the dimensions of the bottles to be housed. In this case, the matching shape of the housings and the bottles 9 of plasma allows the distance between the bottles and the refrigeration system to be minimised, in other words, between the bottles and the refrigerating surface of the housings, maximising heat transfer and facilitating cooling of the bottles.

The housings for the bottles of plasma may have an initial adjustment play, so as to allow the housings contact with the surface of the bottles when the dimensions of the bottles have increased owing to dilation, minimising the distance between housing and bottle during the process, and also facilitating removal of bottles after freezing and dilation. In the example in FIGS. 1, 2 and 3, the housings of the device 1 are shown with a basically cylindrical or prismatic shape, the shape being matched to the shape of the bottles 9 which are also basically cylindrical or prism-shaped. The shape of the housings of the device may be of any known type and is not limited to a specific shape. The device may also comprise housings that have shapes that are different from one another. In this case, each of the different types of housings is adapted to the shape of the different-shaped bottles 9.

FIGS. 2 and 3 show the housings in a vertical position inside the chambers 5. Alternatively, the housings may be distributed horizontally inside the chambers 5, or in any other arrangement, for example diagonally.

Moreover, the device may comprise a liner (not shown) on the outer surface of the housings, which allows air between the housings and the bottles to be eliminated so that heat is transferred between the housing and the liner, and between the liner and the bottles, improving the efficacy of said heat transfer and cooling. Said liner has a liquid on the interior, preferably at a temperature such that said liquid does not freeze during the heat transfer. The liner is preferably a flexible and resilient element which allows the shape thereof to change relative to the dilation of the bottles, so as to maintain contact between housing, liner and bottle. As an alternative to liners, the bottles may be introduced into the housings wrapped in a thermal jacket. In a similar way to the liner described above, said thermal jacket would allow air between the bottle and the housing to be eliminated, while facilitating heat transfer from the refrigerating surface of the housing to the bottle.

In the embodiment shown, the housings are formed by upper housings 42 situated in the lids 2 of the device 1, and lower housings 43 situated in the base portion 3 of the casing of the device 1, so that once the lid 2 or hatch is closed, the shape of the upper 42 and lower 43 housings is adjusted to the shape of the bottles. Alternatively, the housings may not comprise a division in the upper housing and lower housing and may be made up of a single housing situated in the base portion of the casing of the device 1.

The refrigeration system of the device 1 may be a contact shock refrigeration system, which allows rapid cooling or freezing of a container by temperature transfer or heat exchange between the object to be frozen and a refrigerated surface. The proximity of the bottles 9 to a refrigerating surface of the housings allows the bottles 9 to be refrigerated. To facilitate ventilation of the refrigeration system, the device 1 comprises a ventilation grating 8, which in FIGS. 1, 2 and 3 is shown positioned in the lower portion of a side of the device 1.

The refrigeration system is controlled by the control system which allows the bottles 9 to be cooled to −30° C. or less in a maximum of 60 minutes. The refrigeration system is arranged to refrigerate the two chambers 5 independently, while the control system is configured to control the refrigeration of said two chambers 5 separately. Thus, the control system allows different cooling cycles to take place in each of the chambers 5, controlling said chambers independently. The control system of the device 1 in the embodiment allows bottles of plasma to be cooled to −40° C. or less in a maximum of 45 minutes. The control system also allows defrosting cycles to be carried out, which allows ice inside the chambers which may appear after continued use of said device to be eliminated, facilitating maintenance of the device 1. The device 1 also comprises a drain (not shown) to remove said defrosting water.

Being able to produce two simultaneous cooling cycles is particularly advantageous in mobile distribution centres, where donors usually arrive at the centre randomly and spaced out in time. Thus, it is possible not to use all the chambers 5 at same time, and for only one of said chambers to be in operation. This has the advantage of not having to wait until a number of bottles equal to the maximum capacity of the device 1 is available to begin a bottle cooling cycle.

During each cycle, the control system controls the refrigeration system allowing the temperature in the walls of the housings to be such as to permit cooling of the bottles of plasma to at least −30° C. in a maximum of 60 minutes. When the temperature of one of the chambers reaches the required temperature, the control system emits a signal to a user interface 7 indicating that said temperature has been reached, so that the operator or qualified staff member knows that the cooling cycle has ended and the bottles may be removed. Alternatively, the lid 2 or hatch portions of each chamber 5 may contain automatic opening means, so that the control system allows said lid 2 or hatch portions to open automatically once the cooling cycle has ended.

The control system also comprises control elements for the refrigeration system situated close to the walls of the housings (both the walls of the upper 42 and lower 43 housings, and of single housings) for the bottles 9 of plasma, which facilitates control of the temperature of the walls of the housings of the chambers 5. Said control elements may comprise sensors. Other sites for said control elements, such as on the walls of the outer portion of the housings, are also possible. Said sensors help control the temperature of the bottles 9 of plasma indirectly. In addition and/or alternatively, the bottles 9 of plasma may contain temperature sensors to control the temperature of said bottles 9.

In the example shown, it is possible to carry out two different cooling cycles independently, by introducing a second group of bottles into a chamber 5 while a first group of bottles is being cooled in another chamber 5, allowing phased working. In this way, instead of introducing bottles in the device every 60 minutes on completion of a cooling cycle, it is possible to introduce bottles in only one of the chambers every 30 minutes. The configuration in two chambers allows the medical staff to minimise the problem of lower amounts of proteins in the plasma 30 minutes after extraction, as plasma can be extracted from donors at 30-minute intervals without having to wait for a device cycle to finish, and a second group of bottles can be introduced into a different chamber from the one in operation. The time needed to extract the plasma, prepare and introduce the bottles is usually less than said 30 minutes.

In the embodiment of a device in the figures, each of the two chambers 5 comprises three housings for bottles 9, the capacity of each chamber 5 being three bottles and the maximum capacity of the device 1 being six bottles 9. In addition, the device 1 may comprise more chambers 5, or additional housings in each of the chambers 5 so that the maximum capacity of the device 1 is greater. The device 1 may comprise fewer than six housings for bottles, as the device 1 is not limited as to the total number of housings for bottles.

The device 1 comprises display windows 6 for observing the interior of each of the chambers 5 situated in the front portion of the casing of the device. If the method of opening the chambers 5 of the device 1 is by doors, the display window 6 may be situated on said doors, but other arrangements of said display windows relative to the device are equally valid.

FIGS. 1 and 3 also show a user interface 7 arranged on a side wall of the device 1. Alternatively, the interface 7 may be positioned on any other side wall of the device 1, or may be an interface external to the device 1. Said interface 7 is a touch screen of a known type, being a single interface for controlling both chambers. In a non-preferred embodiment, the device 1 comprises an interface 7 for each of the chambers 5.

The interface 7 makes it easier for the medical staff to be able to control and display data for both chambers 5 from the outside, making it easier to monitor the cooling cycles of both chambers 5, and to monitor parameters such as the temperature of each chamber 5 or the time elapsed in the cycles. Said interface 7 also allows other elements to be monitored such as the display windows 6, the housings, alerts, sensors or other safety elements also placed in the device 1. From these data, the medical staff can produce operating reports on the cooling cycles of the different chambers 5 for later follow-up. In addition, the device may also comprise additional data entry means, such as control buttons, a keyboard or a joystick, and be controlled by control means of a known type.

The control system of the device 1 comprises an emergency stop button 70 for the refrigeration system. As the device 1 is operating at low temperatures, the insulation of the casing of the device 1 must have all the necessary elements and undergo the proper maintenance to ensure appropriate insulation of the device from the exterior. The emergency stop button 70 allows the hatches or lids 2 of the chambers 5 to be opened in the event of a break in the insulation that prevents the device 1 from operating correctly, thus allowing the bottles 9 to be removed before the end of the cycle to avoid impairing the properties of the plasma inside said bottles 9. Said emergency stop button 70 may be embedded in a security module on the front portion of the device 1. Alternatively, the emergency stop button 70 may be arranged on any other portion of the casing of the device 1.

Although the figures show a device 1 that comprises two cooling chambers 5 in the interior thereof, the device according to the present invention is not limited to two chambers, and may comprise more than two chambers or only one chamber. In these cases, the device would comprise a lid, a means of opening the lid and a display window for each of the chambers.

In addition, the device 1 comprises a bar code reader which allows the codes identifying each of the bottles 9 to be read. As the bottles 9 usually comprise a bar code to identify the donation, the reader makes it easier to identify the bottles in each cycle. The device may also comprise a sealing system, which is preferably a cable gland. Said fluid-tight sealing system maintains isolation and at the same time makes it easier to place probes. Said probes may be connected between an external recording system and the device.

The device 1 also allows the control elements to be validated by positioning one or two test or dummy bottles 9. In the validation process, the bottles are connected to the PLC connector of the device 1, preferably by a probe.

Figure 4:
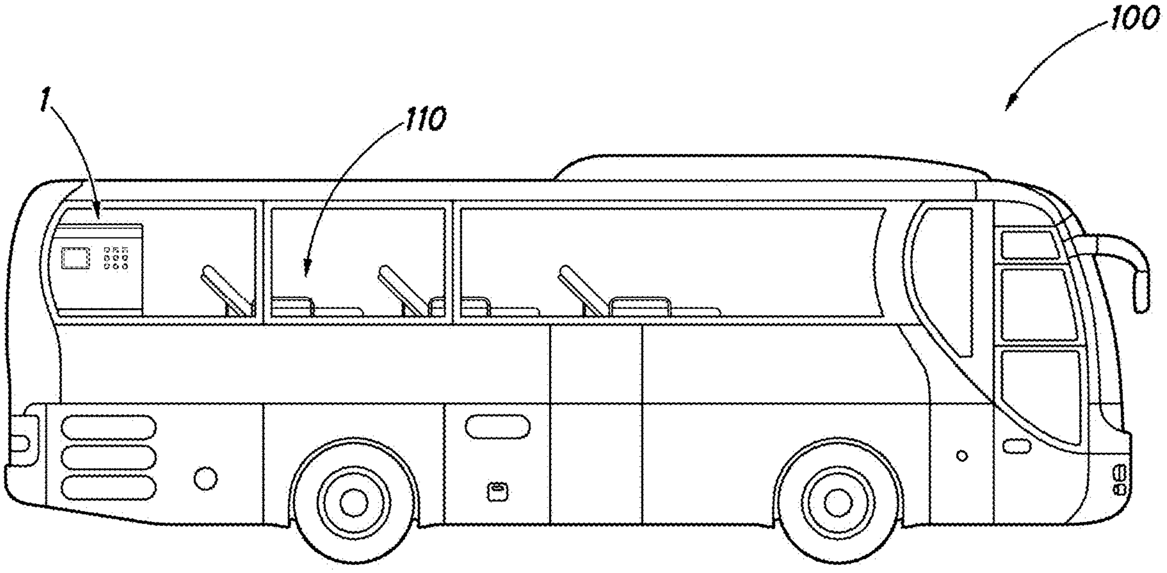
FIG. 4 is a schematic view of a mobile distribution centre according to the present invention.

FIG. 4 shows a mobile distribution centre 100 which is a vehicle, more specifically a motor bus. The motor bus 100 has a device 1 inside for cooling bottles of plasma according to the present invention, which comprises two separate chambers with housings for arranging bottles of plasma inside, and seats 110 for donation and/or extraction of plasma from donors, patients or individuals by plasmapheresis.

In the example shown, the mobile distribution centre 100 is shown with six seats 110, the device 1 comprising two separate chambers with at least six housings for arranging at least six bottles inside, three in each of the chambers. The present invention is not limited to a specific number of seats in the donation centre. Alternatively, the donation centre may comprise more or fewer than six seats, and the device 1 may also have more or fewer than six housings for bottles of plasma in the interior thereof.

By having two separate chambers and being able to carry out two bottle cooling cycles simultaneously and phased over time, it is not necessary for the number of donors to equal the maximum capacity of the device for extracting plasma from each. It also allows cooling cycles to be carried out with a smaller quantity of bottles of plasma, which is advantageous in situations where there is a smaller number of donors. By being able to introduce half the bottles into the device at the same time instead of using the total capacity thereof (if the device had only one chamber), the motor bus 100 in FIG. 4 also allows phased blood extractions to be carried out in a similar way to the cooling cycles.

Alternatively, the device 1 is portable or has carrying means to facilitate the movement thereof inside and outside the motor bus. In addition, the motor bus may have more donation seats and/or more than one container cooling device 1.

Although the invention has been described and illustrated on the basis of a representative example, it will be understood that said embodiment given as an example in no way limits the present invention, and therefore any modifications included directly or by equivalence in the content of the accompanying claims should be considered to fall within the scope of the present invention.

What is claimed is:

1. A device for cooling plasma for a center for collecting plasma by plasmapheresis, said device comprising a casing with at least one cooling chamber in the interior thereof, the chamber comprising housings for cooling containers;

the device comprising a refrigeration system arranged to refrigerate said chamber, and a control system for the refrigeration system, the refrigeration system and the control system being configured to control the temperature inside the device so as to allow the containers to be cooled to at least −30° C. in 60 minutes or less, wherein the device comprises at least two separate chambers contained in said casing, each of the chambers comprising housings for cooling bottles of plasma, wherein the refrigeration system is arranged to refrigerate both chambers independently, and wherein the control system is configured to control the refrigeration of both chambers separately;

wherein the housings are configured to cool the bottles of plasma by contact therewith, and wherein the housings have a shape that matches the shape of the bottles to minimize the distance between the bottles and the housing such that the containers are completely cooled to at least −30° C. in 60 minutes or less.

2. The device according to claim 1, further comprising at least two independent lids on said casing, said lids being arranged so as to independently access each of the chambers.

3. The device according to claim 2, wherein the casing comprises a base portion, the lids of the device and the base portion being connected together by hinges.

4. The device according to claim 1, wherein the housings for cooling bottles of plasma comprise refrigerated walls.

5. The device according to claim 1, further comprising display windows for observing the interior of each of the chambers.

6. The device according to claim 1, further comprising a single user interface to control both chambers.

7. The device according to claim 6, wherein the interface is positioned on a wall of the device.

8. The device according to claim 1, wherein the casing comprises internal insulation.

9. A distribution center, comprising the device according to claim 1.

10. The center according to claim 9, wherein the device is built into the interior of the distribution center.

11. The center according to claim 9, wherein the center is a mobile distribution center.

12. The center according to claim 9, wherein the center is a motor bus.

13. The device according to claim 1, wherein the control system is configured to initiate a cooling cycle of the bottles of plasma in one of said two separate chambers while another cooling cycle in the other one of said two separate chambers is still in progress.

14. The device according to claim 1, wherein the control system comprises an emergency stop button for the refrigeration system, wherein the emergency stop button is configured to open a lid of the chamber in the event of a break in an insulation.

15. The device according to claim 14, wherein the emergency stop button is embedded in a security module on a front portion of the device.

16. The device of claim 1, wherein the housings for the bottles of plasma are cylindrical or prism shaped bottles to match the shape of the bottles, thereby facilitating contact and minimizing the distance between the bottle surface and the housing.

17. The device of claim 1, further comprising a flexible liner on an outer surface of each housing, the liner containing a liquid and being made of a flexible and resilient material, the liner being configured to conform to the bottle surface and eliminate air pockets between the bottle and the housing.

18. The device of claim 1, wherein each housing for the bottles of plasma is formed by an upper housing situated in a lid of the device and a lower housing situated in a base portion of the device.

19. The device of claim 1, wherein the dimensions of each housing are slightly larger than the dimensions of the bottle so that an initial clearance is present prior to freezing and disappears during freezing due to expansion of the bottle contents and dilatation of the bottle, thereby increasing the contact surface of the bottle with the refrigerated walls of the housings.

* * * * *